United States Patent
Allen et al.

(10) Patent No.: US 7,275,591 B2
(45) Date of Patent: Oct. 2, 2007

(54) TUBING HANGER WITH BALL VALVE IN PRODUCTION STRING

(75) Inventors: Gregory Wayne Allen, Spruce Grove (CA); Men Fung Chin, Edmonton (CA)

(73) Assignee: ERC Industries, Edmonton, AB (CA)

( * ) Notice: Subject to any disclaimer, the term of this patent is extended or adjusted under 35 U.S.C. 154(b) by 260 days.

(21) Appl. No.: 11/226,894

(22) Filed: Sep. 14, 2005

(65) Prior Publication Data

US 2006/0060348 A1 Mar. 23, 2006

Related U.S. Application Data (60) Provisional application No. 60/609,931, filed on Sep. 14, 2004.

(51) Int. Cl.
*E21B 34/02* (2006.01)

(52) U.S. Cl. ............... 166/86.1; 166/330; 166/368

(58) Field of Classification Search ............... 166/97.1, 166/95.1, 91.1, 86.1, 316, 330, 332.3, 368, 166/386; 251/315.1, 315.14
See application file for complete search history.

(56) References Cited

U.S. PATENT DOCUMENTS

| | | | |
|---|---|---|---|
| 2,092,261 A * | 9/1937 | Rector | 166/95.1 |
| 3,115,934 A * | 12/1963 | Rector | 166/97.5 |
| 3,601,190 A | 8/1971 | Mott | |
| 4,144,937 A | 3/1979 | Jackson et al. | |
| 4,154,298 A | 5/1979 | Gano | |
| 4,293,038 A | 10/1981 | Evans | |
| 4,552,335 A | 11/1985 | Alexander et al. | |
| 4,562,888 A | 1/1986 | Collet | |
| 4,681,133 A | 7/1987 | Weston | |
| 4,690,221 A | 9/1987 | Ritter, Jr. | |
| 4,703,807 A | 11/1987 | Weston | |

(Continued)

FOREIGN PATENT DOCUMENTS

GB 2356239 A * 5/2001

*Primary Examiner*—Kenneth Thompson
(74) *Attorney, Agent, or Firm*—Greenlee Winner and Sullivan PC (57) ABSTRACT

The invention provides a wellhead assembly including a wellhead housing supporting a tubing hanger within its central bore and forming a housing stem port through its outer wall to the central bore. The tubing hanger has a side stem port formed through its body intermediate its upper and lower ends providing access to the central bore of the hanger and being aligned with the housing stem port. The tubing hanger includes a ball valve member having a spherical exterior surface sealed and seated from above and below within the central bore of the hanger. The ball valve member forms a through port extending therethrough aligned with the production bore, and is rotatable in its seated position between open and closed positions with the through port being aligned with the production bore when in the open position. A slot in the exterior surface of the ball valve member if formed proximate the stem port. A ball stem assembly is sealed for axial rotation in both the stem port of the body and the housing stem port of the wellhead housing, one end of the stem providing a coupling for rotatably coupling to the slot in the ball valve member, the other end of the stem assembly extending exterior of the wellhead housing. The ball valve member is externally operated between open and closed positions by an operator coupled to the ball stem assembly exterior the wellhead housing.

13 Claims, 7 Drawing Sheets

U.S. PATENT DOCUMENTS

| | | |
|---|---|---|
| 4,791,986 A | 12/1988 | Vallet |
| 4,807,700 A | 2/1989 | Wilkins |
| 5,535,826 A | 7/1996 | Brown et al. |
| 5,687,794 A | 11/1997 | Watkins et al. |
| 5,865,246 A | 2/1999 | Brown |
| 5,873,415 A | 2/1999 | Edwards |
| 5,992,527 A | 11/1999 | Garaham et al. |
| 6,009,945 A | 1/2000 | Ricks |
| 6,109,353 A | 8/2000 | Edwards et al. |
| 6,170,578 B1 | 1/2001 | Edwards et al. |
| 6,176,316 B1 | 1/2001 | Hart |
| 6,227,301 B1 | 5/2001 | Edwards et al. |
| 6,345,668 B1 | 2/2002 | Reilly |
| 6,488,083 B2 | 12/2002 | Bartlett et al. |
| 6,679,330 B1 | 1/2004 | Compton et al. |
| 6,698,712 B2 | 3/2004 | Milberger et al. |
| 6,729,392 B2 | 5/2004 | DeBerry et al. |

* cited by examiner

FIG.10B

TUBING HANGER WITH BALL VALVE IN PRODUCTION STRING

CROSS REFERENCE TO RELATED APPLICATIONS

The present application claims benefit of U.S. Provisional Patent Application No. 60/609,931, filed Sep. 14, 2004, which is incorporated in its entirety herein by reference to the extent not inconsistent herewith.

FIELD OF THE INVENTION

This invention relates to a wellhead assembly with a tubing hanger having a production bore extending generally vertically there through and a ball valve assembly which is externally operable for controlling fluid flow through the production bore.

BACKGROUND OF THE INVENTION

In a conventional flow completion system, a tubing hanger is landed in a wellhead housing, typically a tubing head, at the upper end of a well bore, and a Christmas tree is connected to the top of the wellhead housing over the tubing hanger. The tubing hanger supports at least one tubing string which extends into the well bore and defines a production bore within the tubing string. The tubing hanger itself forms at least one vertical production bore for communicating fluid between the tubing string and a corresponding production bore in the Christmas tree located above the tubing hanger. While it is common to provide for one or more valve closures in the production bore, this is usually provided in the Christmas tree above the tubing hanger, or is run into the production bore of the tubing hanger. For some applications, it is desirable to have an in-dwelling valve closure member in the tubing hanger. For instance, should one or more of the valves in the Christmas tree need replacing, it is desirable to make provision for running in of a valve or plug in the production bore or tubing hanger. As well, it may be desirable to have a removable valve or plug in place in the tubing hanger when running or retrieving the tubing hanger. However, running of a back pressure valve or plug in the tubing hanger is a complex and expensive task, particularly if the well is remotely located.

Thus, for some applications, it is desirable to have an in-dwelling valve member in the tubing hanger. To date, ball valves have not traditionally been used for this purpose. While ball valve closure members are described in the smaller annulus bore of a tubing hanger (see for example U.S. Pat. No. 6,679,330 to Compton et al.), they are not traditionally used in the production bore. A few patents describe ball valves in the production bore of a tubing hanger, but these devices are generally complex, involving complicated actuation sleeves which are hydraulically or electrically activated for operation (see for example U.S. Pat. No. 6,698,712 to Milberger et al.). There remains a need for a simple wellhead device to provide for flow control in the production bore of a tubing hanger.

SUMMARY OF THE INVENTION

The present invention provides an externally operable ball valve closure member in the production bore of a tubing hanger.

Broadly stated, the invention provides a wellhead assembly which houses the tubing hanger of the present invention. In combination, the invention includes a wellhead housing such as a tubing head, having an outer wall and a central bore, the housing forming an inwardly extending landing shoulder for supporting a tubing hanger within its central bore, and a housing stem port in the outer wall providing access to the central bore. The tubing hanger itself includes:

a) a generally tubular body forming a vertical central bore which provides a production bore extending generally axially through the body, and a landing shoulder formed on the outer surface of the body to cooperate with the housing landing shoulder in supporting the tubing hanger therein;

b) the lower end of the body being adapted for suspending a tubing string;

c) the upper end of the body being adapted for receiving a landing joint;

d) a side stem port formed through the body intermediate its upper and lower ends providing access to the vertical central bore of the body and being aligned with the housing stem port;

e) seals on the exterior of the body above and below the side stem port for sealing the body in the central bore of the wellhead housing; and f) a ball valve member having a spherical exterior surface sealed and seated from above and below within the central bore of the body, the ball valve member forming a through port extending therethrough aligned with the production bore, the ball being rotatable in its seated position between open and closed positions with the through port being axially aligned with the production bore when in the open position, the ball valve member forming a slot in the exterior surface proximate the stem port.

The invention also provides a ball stem assembly sealed for axial rotation in both the side stem port of the tubing hanger body and the housing stem port of the wellhead housing. A first end of the ball stem assembly provides a coupling for rotatably coupling to the slot in the ball valve member, while the second end of the ball stem assembly extends exterior of the wellhead housing. An external operator is coupled to the second end of the ball stem assembly exterior the wellhead housing for rotating the ball stem assembly, and thus the ball valve member, between open and closed positions.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

It should be understood that reference herein and in the claims to the tubing string which is suspended from the lower end of the tubing hanger is meant to include coil tubing. Further, it should be understood that reference to a ball valve member herein and in the claims is meant to include generally spherical ball members which are not strictly spherical on all sides, such as a ball member which is generally cylindrical between its spherical ends.

DESCRIPTION OF THE PREFERRED EMBODIMENTS

Figure 1:
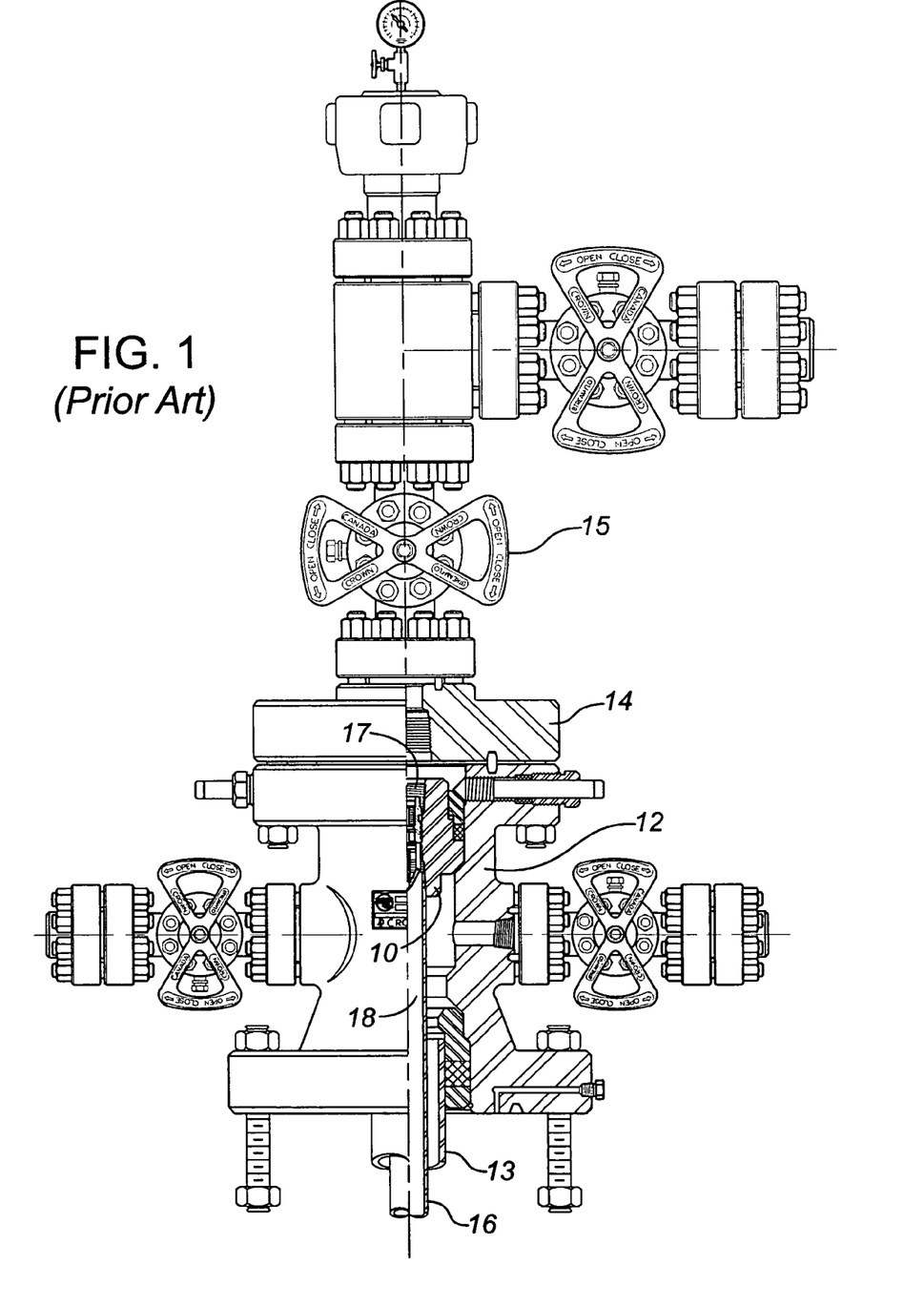
FIG. 1 is a side view, partially in section, showing a prior art tubing head and tubing hanger with a run in back pressure valve, the tubing head being located below typical Christmas tree components.

FIG. 1 is included to show a tubing head/tubing hanger arrangement of the prior art, in which a tubing hanger 10 is sealed and supported within a wellhead housing, here shown as a tubing head 12. The tubing head 12 is adapted at its lower end for connection to the next wellhead member, typically a casing head (not shown) to suspend casing 13. The tubing head 12 is shown connected at its upper end to a tubing head flange adaptor 14, and Christmas tree components 15 (shown in order in FIG. 1 is a master valve, a flow tee with a wing valve and a top connector). The Christmas tree components 15 are known in the art and will typically include one or more valves and blow out preventer (BOP) stack). The tubing hanger 10 is adapted at its lower end to suspend production tubing 16. Shown in FIG. 1 is a back pressure valve 17, which must be run in as described above when one wishes to close off the production bore 18 at the tubing hanger 10. As indicated above, running and retrieving a back pressure valve 17 or plug in the tubing hanger is a complex operation, a problem which is addressed by the present invention.

Figure 2:
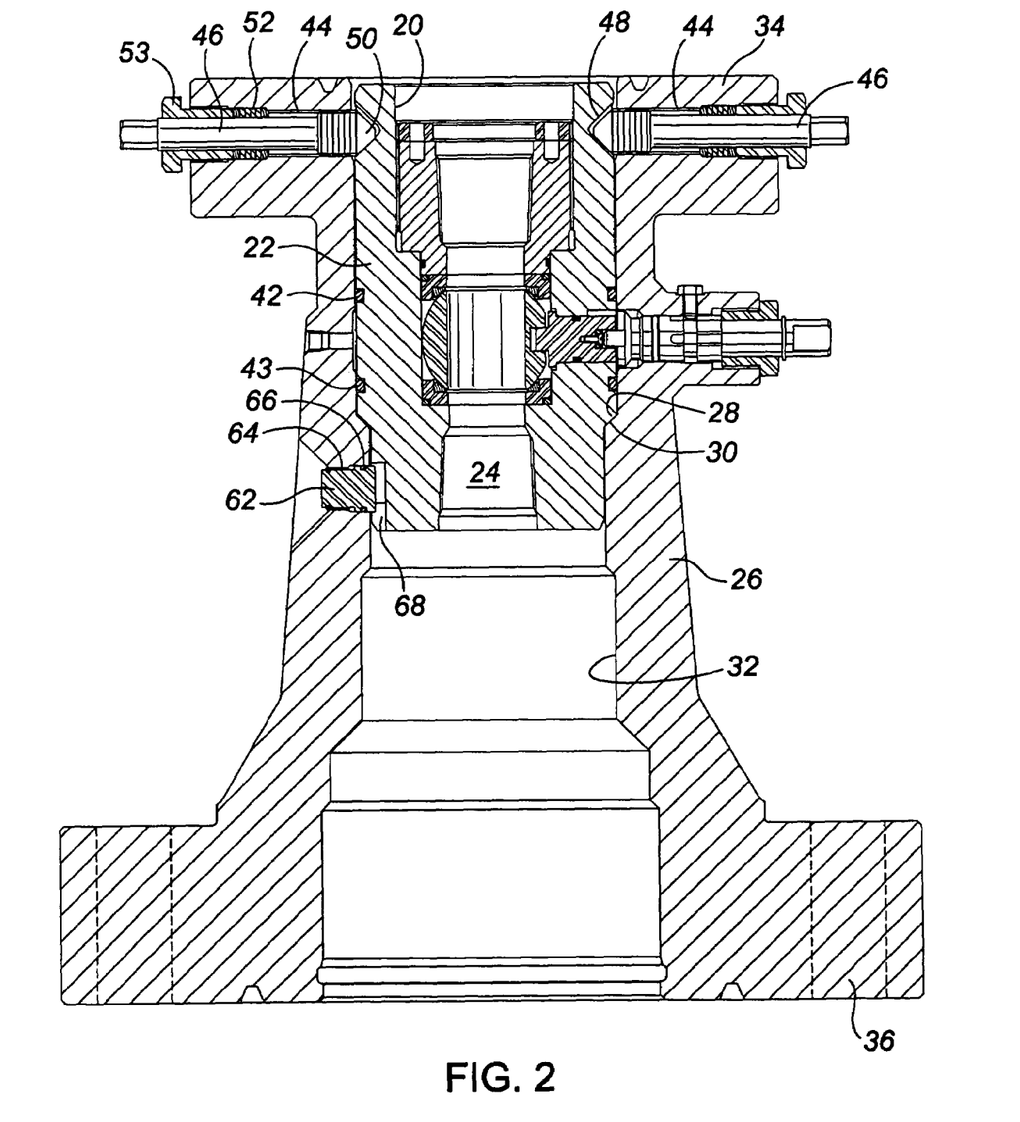
FIG. 2 is a side sectional view of the tubing hanger of the present invention, landed in a wellhead housing comprising a tubing head.
Figure 3:
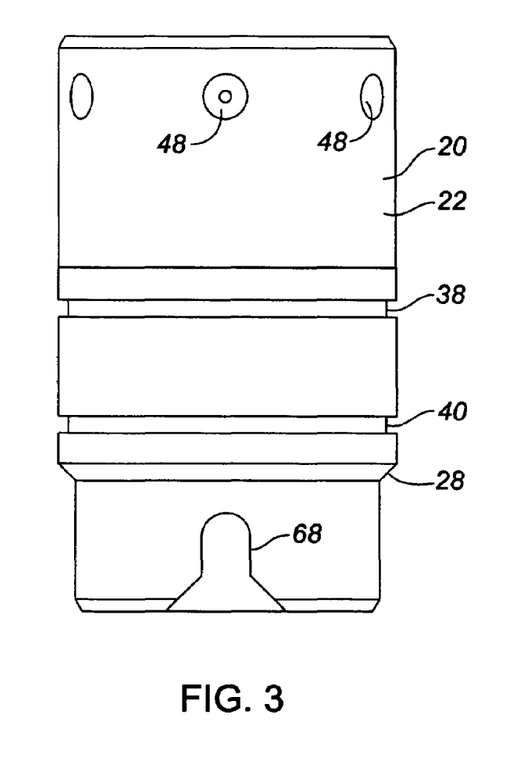
FIG. 3 is a side view of the tubing hanger of FIG. 2, showing the aligning slot to align the stem ports and stems in the tubing hanger and tubing head.
Figure 4:
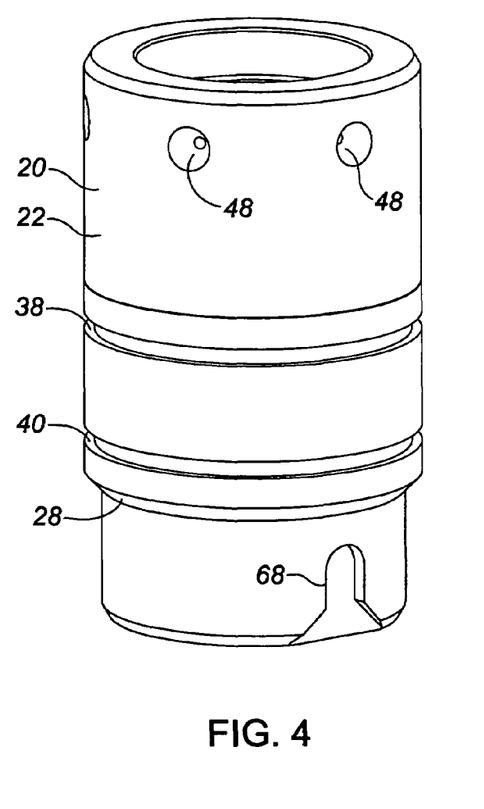
FIG. 4 is a perspective view of the tubing hanger of FIG. 2.

Having reference to FIG. 2, the tubing hanger of this invention is shown generally at 20, to include a generally tubular body 22, formed with a vertical central production bore 24. The tubing hanger 20 is sealed and suspended within a pressure-containing wellhead housing, here shown as a tubing head 26. The tubing hanger 20 includes a tapered landing shoulder 28 on its outer wall to land against the reduced diameter landing seat 30 formed in the central bore 32 of the tubing head 26. The tubing head 26 is adapted at its upper and lower ends to form pressure sealed top and bottom connectors 34, 36, here shown as flanged up and down connectors, however alternate connectors as known in the art may be used. Typically, the tubing head 26 is connected above to Christmas tree components (not shown), and below to the casing head (not shown), as mentioned with reference to FIG. 1. The wellhead housing which lands the tubing hanger 20 may be other than the separate tubing head 26 shown in the Figures. For instance, the tubing head could comprise multiple connected tubulars, such as a tubing head and a tubing head adapter. Still alternatively, the tubing head might be replaced by an integral wellhead member which combines the tubing head with a casing head and/or one or more of the Christmas tree components, as is known in the art.

Having reference to FIGS. 2-5, the hanger body 22 includes outer annular grooves 38, 40 adapted to receive seals 42, 43, such as O-ring seals, for sealing into the central bore 32 of the tubing head 26. The tubing head 26 and hanger 20 include a lock down mechanism, as known in the art to prevent the tubing hanger from being upwardly dislodged once it is landed. In the Figures, the tubing head 26 is shown to be formed with a plurality of pin side ports 44 at its upper end for tubing hanger locking pins 46. The tubing hanger body 22 is formed with a plurality of dimples 48 spaced circumferentially around its outer surface to align with the ports 44 and locking pins 46 in order to receive the tapered heads 50 of the locking pins 46. The locking pins 46 are threaded at their tapered ends for threading into the side ports 44. The locking pins 46 are sealed within the ports 44 with a plurality of packing rings 52 and gland nuts 53. The gland nuts 53 are threaded into the ports 44 in order to retain and seal the packing rings 52. It will be evident to one skilled in the art that the dimples 48 may alternatively be provided as a circumferential groove in the outside diameter of the tubing hanger body 22. Other lock down mechanisms may also be used, as is known in the art.

Figure 5:
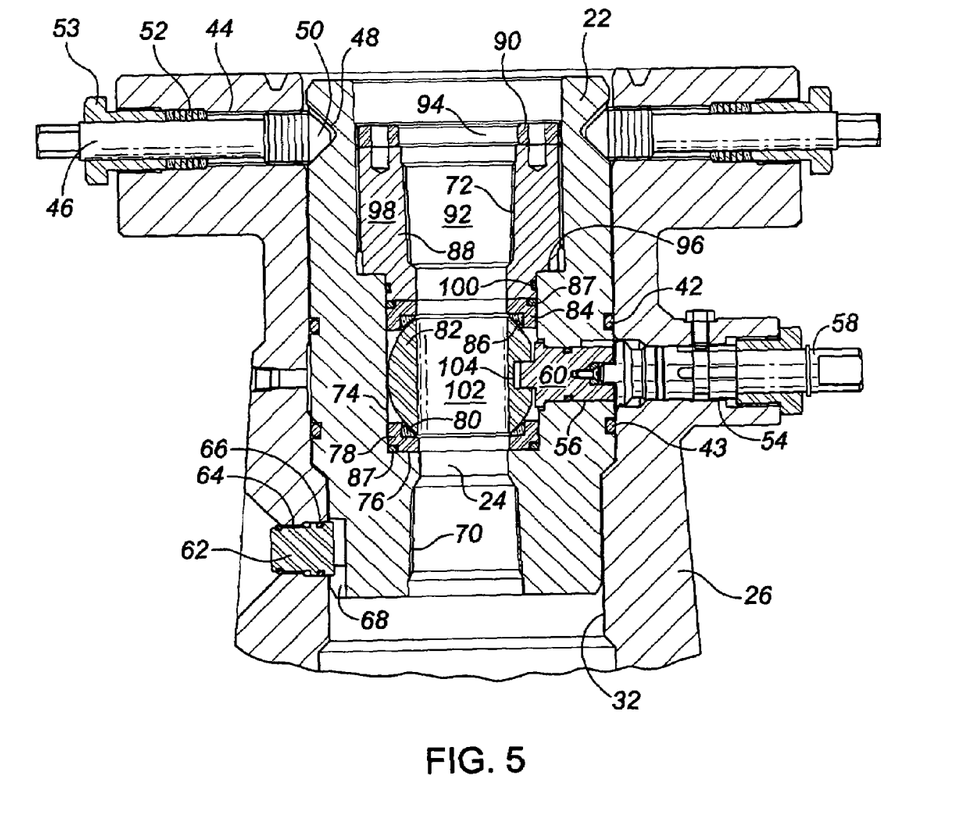
FIG. 5 is a side sectional view of the tubing hanger of the present invention, with the lower portion of the tubing head cut away in order to show greater detail of the ball valve member, the ball stem assembly, and the external operator for the ball valve.

Having reference to FIG. 5, each of the tubing head 26 and tubing hanger body 22 is formed with a stem port formed in its side wall. These stem ports are herein termed tubing head stem port 54 (or housing stem port) and tubing hanger side stem port 56 (or hanger stem port). The seals 42, 43 on the outer surface of the tubing hanger 20 are located above and below these stem ports 54, 56 to seal the hanger 20 against the central bore 32 of the tubing head 26. These stem ports 54, 56 must be strictly axially aligned in order that a tubing head stem 58 (or housing stem) and a hanger stem 60 located therein may co-operate to engage and rotate a ball valve closure member 82 in the manner to be described below. Thus, an alignment mechanism is provided between the tubing head 26 and the tubing hanger 20 such that, on landing of the tubing hanger 20, the tubing hanger stem 60 and hanger stem port 56 are strictly aligned with the tubing head stem 58 and tubing head stem port 54 respectively. One embodiment of this alignment mechanism is shown in FIGS. 2-5 to include an aligning pin 62 extending horizontally through a pin bore 64 in the wall of the tubing head 26, and sealed with a seal 66, such as an O-ring seal. A generally key shaped aligning slot 68 is formed at the lower end of the hanger body 22. Thus, on landing in the tubing head 26, the hanger body 22 is rotated to align with the extended aligning pin 62. Alternate alignment mechanisms may be used. For instance, although not shown, a tapered alignment block (ex. triangular, with apex pointing upward) could be provided in the central bore 32 of the tubing head 26 (ex. attached by welding) for alignment with a matching recess milled on the outside diameter of the tubing hanger 20. Other alignment mechanisms will be evident to persons skilled in the art.

The lower end of the production bore 24 of the tubing hanger 20 is adapted to suspend a tubing string (not shown), as is known in the art. In FIG. 5, one embodiment is shown to include an upper threaded portion 70 for suspending threaded tubing string sections (not shown) as is known in the art. The tubing string (which could be coiled tubing instead of production tubing) might be suspended by other connectors such as by welding or slip lock connectors, as is known in the art. The upper end of the production bore 24 of the tubing hanger 20 is adapted to accept a landing joint (not shown), as is known in the art. In FIG. 5, one embodiment is shown to include an upper threaded portion 72 for this purpose. The hanger body 22 is formed to provide a ball chamber 74 within its production bore 24 between its upper and lower ends. This ball chamber 74 is shown to have a widened diameter relative to that of the production bore 24.

As shown in the FIGS. 2-5, the hanger body 22 is formed with a counterbore 76 at the lower end of the ball chamber 74. A lower annular seat 78 is located in the counterbore 76. A lower annular seat seal 80 is held within the seat 78 for sealing against the spherical surface of the ball valve member 82. Similarly, at the upper end of the ball chamber 74, an upper annular seat 84 is provided, with an upper annular seat seal 86 for sealing against the spherical surface of the ball valve member 82. Seals 87, such as O-ring seals, are located between the seats 78 and 84 for sealing against the central bore 24 of the tubing hanger 20. The upper annular seat 84 is retained in the ball chamber against upward movement by an externally threaded tubular retainer ring 88, which is threaded into the central bore 24 of the hanger body 22. Preferably, an upper annular retainer ring 90, also externally threaded, is threaded into the central bore 24 above the retainer ring 88 to prevent backing off of the retainer ring 88. Each of the retainer rings 88, 90 are formed with a central bore 92, 94 respectively. The hanger body 22 is preferably formed with an enlarged diameter counterbore section 96 in its central bore 24 at its upper end to accept the retainer rings 88, 90, such that an enlarged diameter section 98 of the retainer ring 88 seats against the base of the counterbore 96. A seal 100, such as an O-ring seal, is carried at the lower end of the retainer ring 88 for sealing into the central bore 24 of the hanger body 22. Alternate means for retaining the ball valve member 82, seats 78, 84, and seat seals 80, 86 in the ball chamber may be used, as will be evident to persons skilled in the art. Exemplary alternatives are shown in FIGS. 10A-10E, described below.

Having reference to FIG. 5, the ball valve member 82 has a spherical exterior and is formed with a through port 102. When the ball valve member 82 is in the open position, the through port 102 is aligned with the production bore 24. The central bores 92, 94 and through port 102 are preferably axially aligned with and form part of the production bore 24 through the hanger body 22. When the ball member 82 is in the closed position, it is turned 90° relative to the open position shown in the Figures, such that the spherical exterior of the ball is seated and closes off the production bore 24 of the tubing hanger 20. A ball slot 104 is formed along one side of the ball valve member 82.

Figure 7:
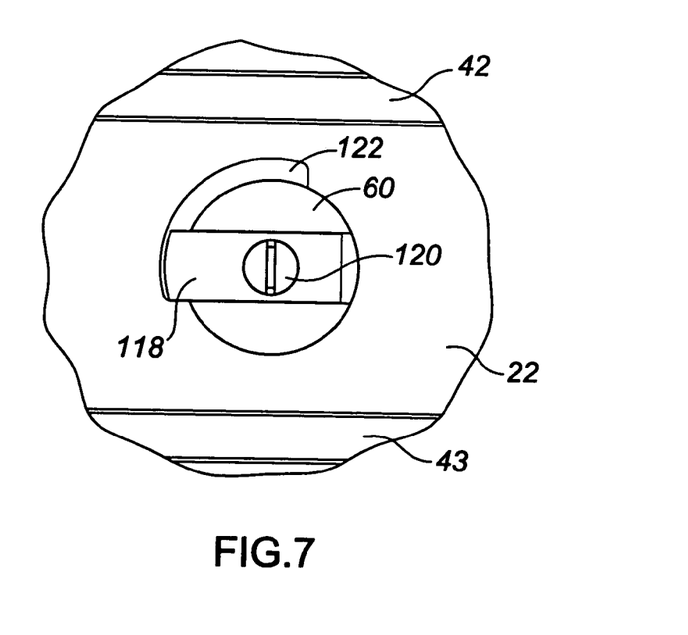
FIG. 7 is a cut away side view of the stopper plate in the connected end of the hanger stem, which allows the hanger stem to be rotated only through 90° in order to rotate the ball valve member between open and closed positions.
Figure 8:
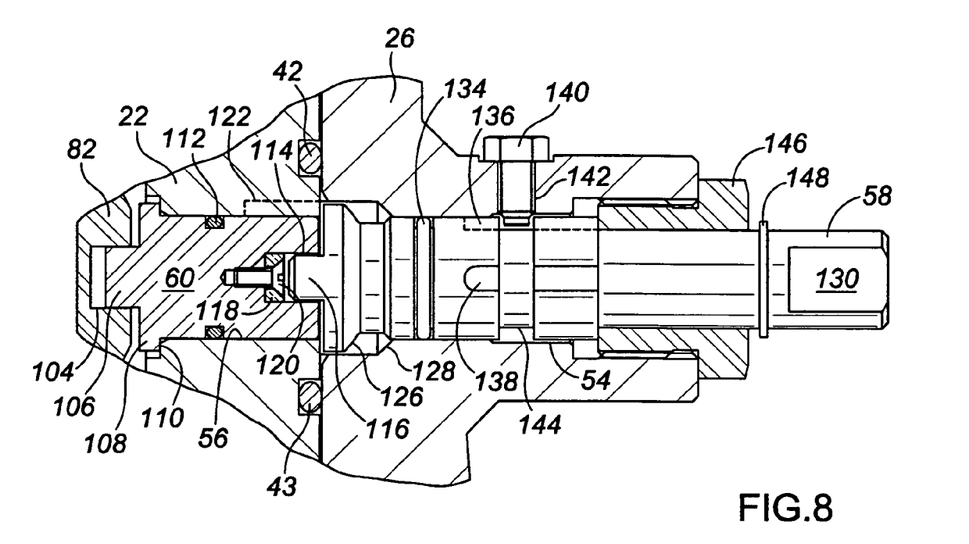
FIG. 8 is a side sectional view of the of the ball stem assembly for the ball valve member showing the tubing head stem in the extended and engaged position, such that rotation of the tubing head stem (not in section) rotates the hanger stem and the ball valve member.
Figure 9:
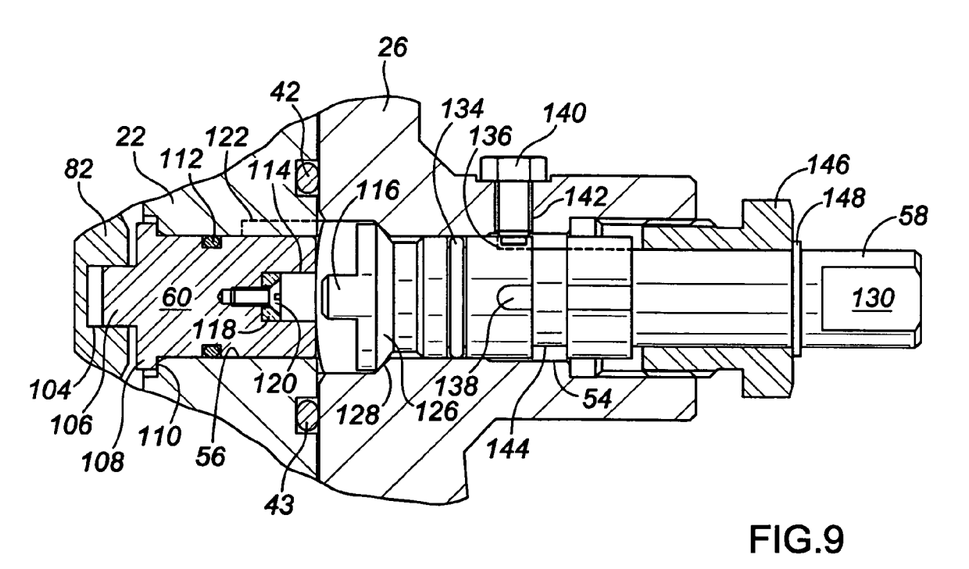
FIG. 9 is a side sectional view of the ball stem assembly for the ball valve member as described for FIG. 8, but showing the tubing head stem in the retracted position for initial landing or removal of the tubing hanger within the tubing head.

Having reference to FIGS. 8-9, a protruding tongue 106 formed at the ball-facing inner end of the hanger stem 60 is received in the ball slot, such that 90° rotation of the hanger stem 60 results in the open and closing action of the ball valve member 82. The hanger stem 60 is formed with a widened diameter stop shoulder 108 which is held in a stop counterbore 110 formed in the central bore 24 of the hanger body 22 adjacent the ball valve member 82. This stop shoulder 108 prevents the hanger stem 60 from being dislodged from the hanger stem port 56 from pressure in the production bore 24. A hanger stem seal 112, such as an O-ring seal, seals the hanger stem 60 against the hanger stem port 56. The outer end of the hanger stem 60 is formed with a hanger stem slot 114, adapted to receive a protruding tongue 116 formed at the hanger-facing end of the tubing head stem 58. As best shown in FIGS. 7-9, a stop plate 118 is fastened by screw 120 into the hanger stem slot 114. The stop plate 118 is restricted to 90° rotational movement within a 90° arc slot 122 which is formed by the hanger body 22 at the outer end of the hanger stem port 56. This restricts the movement of the hanger stem 60 to the strict 90° to open and close the ball valve member 82 as the tongue 116 of the tubing head stem 58 is likewise moved through 90°.

Figure 6:
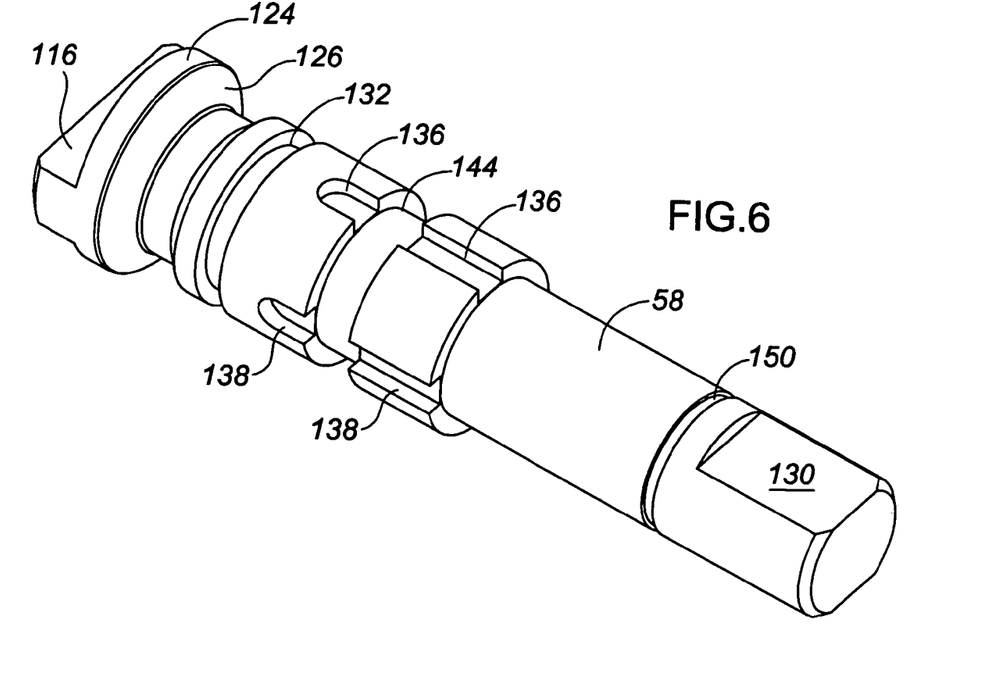
FIG. 6 is a perspective view of the tubing head stem (or housing stem) for connection to the external operator, and showing the aligning slots on the tubing head stem for the locator pin.

Turning to the tubing head stem 58, it is shown in detail in FIGS. 6, 8 and 9. The protruding tongue 116 is formed on an enlarged diameter inner end portion 124 so as to form a tapered stop shoulder 126 which back seats and seals with a metal to metal seal against a tapered back seating counterbore 128 formed at the inner end of the tubing stem port 54. This back seating prevents the tubing head stem 58 from being dislodged from the tubing head stem port 54 with pressure from the production bore 24 and/or the central bore 32.

The outer end of the tubing head stem 58 extends externally of the tubing head 26 for coupling to an external operator. As shown in FIGS. 6, 8 and 9, the outer end of stem 58 is formed with flattened portions 130 for rotation by a wrench or other external operator, for instance a hand crank. Other external operators may also be coupled to the tubing head stem 58, for example an electrical or hydraulic actuator (not shown), as is understood in the art.

A circumferential seal groove 132 (FIG. 6) is preferably formed in the tubing head stem 58 for a seal 134, such as an O-ring seal, to seal the tubing head stem 58 within the tubing head stem port 54.

The tubing head stem 58 is preferably formed with a locator mechanism to initially locate the stem tongue 116 in either the open or closed position, depending on whether the ball valve member 82, and thus the tubing hanger stem slot 114, is being landed in the open or closed position. One embodiment of such locator mechanism is shown in FIGS. 6, 8 and 9 to include first and second axial stem slots 136, 138, which are circumferentially spaced by 90° on the tubing head stem 58. A locator pin 140 extends through a vertical pin aperture 142 formed in the tubing head 26 through to the tubing head stem slots 136, 138. A second circumferential groove 144 is formed in the tubing head stem 58 to receive the locator pin 140. In FIG. 9, the locator pin 140 is shown to be located in the second axial stem slot 136 for initial landing of the tubing hanger 20 in the ball open position, with the tubing head stem 58 in the retracted position. The stem 58 will also be in this position for removal of the tubing hanger 20. In FIG. 8, the locator pin 140 is shown to be still within axial stem slot 136, but now aligned with the circumferential groove 144 such that the tubing head stem 58 can be rotated.

In order to extend and retract the tubing head stem 58, the tubing head stem port 54 is threaded at its outer end. A stem nut 146 which is externally threaded is received in the stem port 54. The stem nut 146 is shown in the extended (forward threaded) position in FIG. 8. In FIG. 9, the stem nut 146 is shown in the retracted (reverse threaded) position to retract the stem 58. During this reverse threading action, the stem nut 146 acts against a snap ring 148, held within groove 150 (see FIG. 6) on the tubing head stem 58, to retract the stem 58.

Figure 10A:
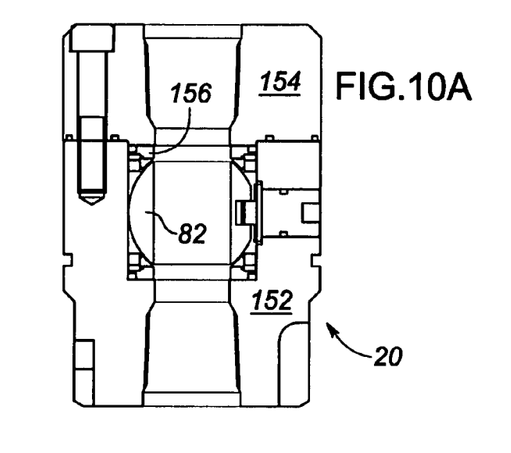
FIGS. 10A-10E are schematic side sectional views of the tubing hanger of this invention showing alternate retainers (retainer means) for retaining the ball valve member within the production bore of the tubing hanger.
Figure 10B:
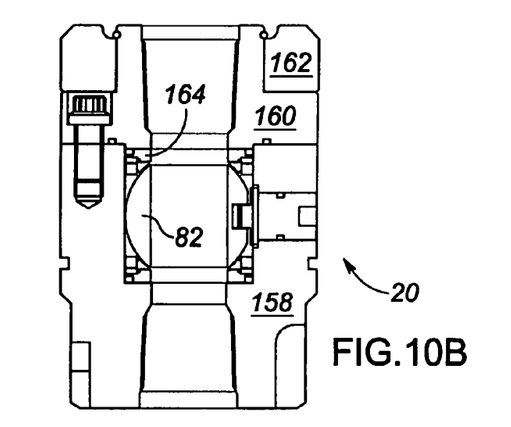
Figure 10C:
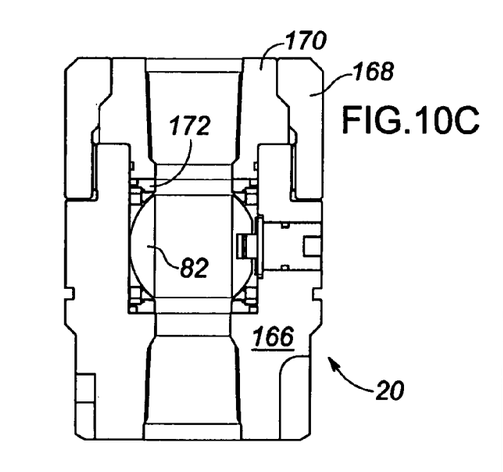
Figure 10D:
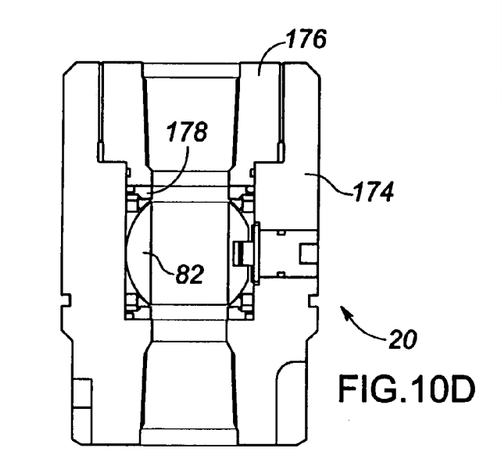
Figure 10E:
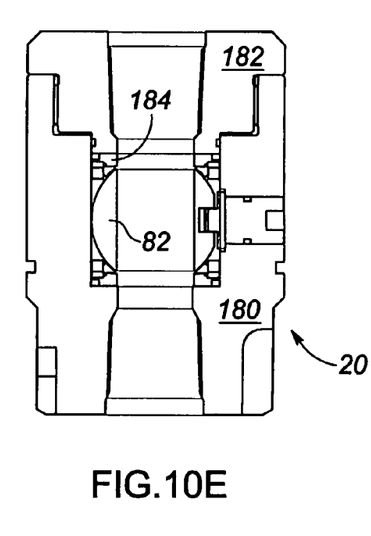

FIGS. 10A-10E show schematically, alternate retainer embodiments for retaining the ball valve member 82, the annular seats 78, 84, and the annular seat seals 80, 86 (collectively the ball valve elements) within the ball chamber 74, and thus within the production bore 24 of the tubing hanger 20. In FIG. 10A, the tubular body of the tubing hanger 20 is shown to be formed as a two piece bolted design 152, 154, with the top piece 154 forming an inwardly extending lip 156 to retain the ball valve elements. In FIG. 10B, the tubular body of the tubing hanger 20 is formed as a three piece bolted design 158, 160, 162 with a top ring 160 providing an inwardly extending lip 164 to retain the ball valve elements. In FIG. 10C, the tubular body of the tubing hanger 20 is formed as a three piece threaded design 166, 168, 170 with an upper, outer ring 168 which locks a middle ring 170 in place. Here, the middle ring 170 forms an inwardly extending lip 172 to retain the ball valve elements. In FIG. 10D, the tubular body of the tubing hanger 20 is formed as a two piece threaded design 174, 176, with an inner ring 176 providing the lip 178 which retains the ball valve elements. In this design, thread locking is provided between the threaded body parts 174, 176. In FIG. 10E another embodiment of a two piece 180, 182 threaded tubular body is shown with the inner ring 182 providing the upper lip 184 to retain the ball valve elements. Here again, thread locking is provided between the body parts 180, 182. Other embodiments of the invention for retaining the ball valve member in a seated and sealed relation within the production bore of the tubing hanger will be evident to persons skilled in the art.

The tubing hanger 20 and tubing head 26 will typically be formed of pressure containing metal materials such as carbon steel. The stems 58, 60 will likewise typically be formed from a metal material such as carbon steel. The ball valve member 82 may be made of any suitable material, but will usually be made of carbon steel. The annular seats 78 and 84 will typically be formed as metal rings. The annular seat seals 80 and 86 are preferably formed from a thermoplastic material, while the remaining seals 42, 43, 52, 66, 87, 100, 112 will typically be formed from elastomeric sealing materials.

All publications mentioned in this specification are indicative of the level of skill in the art of this invention. All publications are herein incorporated by reference to the same extent as if each publication was specifically and individually indicated to be incorporated by reference. The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the best mode contemplated for carrying out the present invention has been herein shown and described, it will be apparent that modification and variation may be made without departing from what is regarded to the subject matter of the invention.

We claim:

1. A tubing hanger for use in a wellhead housing, said wellhead housing having an outer wall and a central bore in which the tubing hanger is sealed and supported, the tubing hanger comprising:

a generally tubular body forming a vertical central bore which provides a production bore extending generally axially through the body;

the lower end of the body being adapted for suspending a tubing string, and the upper end of the body being adapted for receiving a landing joint;

a side stem port formed through the body intermediate its upper and lower ends providing access to the vertical central bore;

seals on the exterior of the body above and below the side stem port for sealing the body in the central bore of the wellhead housing;

a ball valve member having a spherical exterior surface sealed and seated from above and below within the central bore of the body, the ball valve member forming a through port extending therethrough axially aligned with the production bore, the ball valve member being rotatable in its seated position between open and closed positions with the through port being aligned with the production bore when in the open position, the ball valve member forming a slot in its exterior surface proximate the side stem port; and a ball stem assembly sealed for axial rotation in the stem port of the body, one end of the ball stem assembly providing a coupling for rotatably coupling to the slot in the ball valve member, the other end of the ball stem assembly extending through the outer wall of the wellhead housing and being coupled to an operator located exterior the wellhead housing for rotating the ball stem assembly, and thus the ball valve member, between open and closed positions.

2. A wellhead assembly comprising:

a wellhead housing having an outer wall and a central bore, the housing forming an inwardly extending landing shoulder for supporting a tubing hanger within its central bore, and a housing stem port in the outer wall providing access to the central bore;

a tubing hanger comprising:

a) a generally tubular body forming a vertical central bore which provides a production bore extending generally axially through the body, a landing shoulder being formed on the outer surface of the body to cooperate with the housing landing shoulder to support the tubing hanger;

b) the lower end of the body being adapted for suspending a tubing string;

c) the upper end of the body being adapted for receiving a landing joint;

d) a side stem port formed through the body intermediate its upper and lower ends providing access to the vertical central bore of the body and being axially aligned with the housing stem port;

e) seals on the exterior of the body above and below the side stem port for sealing the body in the central bore of the wellhead housing; and f) a ball valve member having a spherical exterior surface sealed and seated from above and below within the central bore of the body, the ball valve member forming a through port extending therethrough axially aligned with the production bore, the ball valve member being rotatable in its seated position between open and closed positions with the through port being aligned with the production bore when in the open position, the ball valve member forming a slot in its exterior surface proximate the side stem port;

a ball stem assembly sealed for axial rotation in both the side stem port of the body and the housing stem port of the wellhead housing, a first end of the ball stem assembly providing a coupling for rotatably coupling to the slot in the ball valve member, and a second end of the ball stem assembly extending exterior of the wellhead housing; and an external operator coupled to the second end of the ball stem assembly and located exterior the wellhead housing for rotating the ball stem assembly, and thus the ball valve member, between open and closed positions.

3. The wellhead assembly as set forth in claim 2, which further comprises an alignment mechanism carried on the wellhead housing and the tubing hanger body to axially align the tubing hanger on landing in the wellhead housing such that the housing stem port and the tubing hanger side stem ports are axially aligned.

4. The wellhead assembly as set forth in claim 3, wherein the alignment mechanism comprises:

the tubing hanger body forming an axial alignment slot at its lower end;

the wellhead housing forming a side bore in its wall proximate the alignment slot of the tubing hanger body; and an alignment pin sealed in the side bore to engage the alignment slot in order to axially align the tubing hanger on landing in the wellhead housing such that the housing stem port and tubing hanger side stem ports are radially aligned.

5. The wellhead assembly as set forth in claim 3, wherein the ball stem assembly comprises:

a separate hanger stem sealed within the tubing hanger side stem port and a separate housing stem sealed with the housing stem port;

a ball-facing end of the hanger stem providing the coupling to the ball valve member, said coupling comprising a protruding tongue for connection and coupling to the ball slot;

an exterior end of the housing stem extending exterior the wellhead housing for connection to the external operator; and a stem-to-stem coupling connecting and coupling the other ends of the hanger and housing stems for concerted axial rotation in the stem ports.

6. The wellhead assembly as set forth in claim 5, wherein the stem-to-stem coupling includes a slot formed on the connected end of the hanger stem, and a protruding tongue formed at the connected end of the housing stem, such that when the tongue is connected and coupled in the slot, the stems have concerted axial rotation in the stem ports.

7. The wellhead assembly as set forth in claim 6, wherein the housing stem is sealed within the housing stem port at its outer end with a stem nut for extending and retracting the housing stem such that it can be connected and coupled with the hanger stem, thereby permitting landing of the tubing hanger within the wellhead housing with the housing stem in a retracted position.

8. The wellhead assembly as set forth in claim 7, wherein the housing stem is formed with first and second axial stem slots positioned to align the tongue of the housing stem with the slot of the hanger stem depending on whether the ball valve member is in an initial open or closed position on landing of the tubing hanger, and wherein the wellhead housing includes a locator pin extending into the housing stem port to engage in one or the other of the first or second stem slots.

9. The wellhead assembly as set forth in claim 8, wherein the hanger stem and housing stem are sealed in the hanger stem port and housing stem port respectively, and wherein the hanger stem and housing stem are back seated in the hanger stem port and housing stem port respectively to prevent dislodging from pressure in the central or production bores.

10. The wellhead assembly as set forth in claim 9, which further comprises:

the ball valve member being seated in a ball chamber in the central bore of the hanger body, the ball chamber having a widened diameter relative to the production bore;

upper and lower annular seats held in sealed relationship within the ball chamber above and below the ball valve member;

upper and lower annular seat seals held within the seats for sealing against the spherical exterior surface of the ball valve member; and a retainer to retain the ball valve member, seats and seat seals within the ball chamber, such that the production bore of the tubing hanger is axially aligned through each of the ball valve member in the open position, the annular seats, the seat seals and the retainer.

11. The wellhead assembly as set forth in claim 10, wherein the retainer includes one or more retainer rings threaded into the bore of the tubing hanger body to retain the ball valve member, seats and seat seals within the ball chamber.

12. The wellhead assembly as set forth in claim 2, which further comprises:

lockdown pin side ports located circumferentially through the wall of the wellhead housing at its upper end;

a lockdown pin sealed for extension and retraction within each of the pin side ports; and a plurality of circumferentially spaced dimples or a circumferential groove formed at the upper end of the hanger body for engagement with the lockdown pins to prevent the tubing hanger from being dislodged from the wellhead housing.

13. The wellhead assembly as set forth in claim 11, which further comprises:

lockdown pin side ports located circumferentially through the wall of the wellhead housing at its upper end;

a lockdown pin sealed for extension and retraction within each of the pin side ports; and a plurality of circumferentially spaced dimples or a circumferential groove formed at the upper end of the hanger body for engagement with the lockdown pins to prevent the tubing hanger from being dislodged from the wellhead housing.

* * * * *